(12) United States Patent
Fujimura et al.

(10) Patent No.: US 6,669,822 B1
(45) Date of Patent: Dec. 30, 2003

(54) METHOD FOR CARBONIZING WASTES

(75) Inventors: Hiroyuki Fujimura, Tokyo (JP); Kazuo Takano, Tokyo (JP); Akira Uchino, Tokyo (JP); Takahiro Ohshita, Tokyo (JP); Tetsuhisa Hirose, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/830,329

(22) PCT Filed: Oct. 28, 1999

(86) PCT No.: PCT/JP99/05977

§ 371 (c)(1), (2), (4) Date: Jun. 7, 2001

(87) PCT Pub. No.: WO00/24671

PCT Pub. Date: May 4, 2000

(30) Foreign Application Priority Data

Oct. 28, 1998 (JP) ............................................. 10-307687

(51) Int. Cl.[7] .............................................. C01B 47/00
(52) U.S. Cl. .............................. 201/37; 201/36; 201/20; 201/32; 423/445 R; 502/418; 502/423
(58) Field of Search .............................. 201/21, 25, 31, 201/40, 37, 27, 32, 36; 423/460, 461, 445 R; 502/418, 423

(56) References Cited

U.S. PATENT DOCUMENTS 3,887,461 A * 6/1975 Nickerson et al. .......... 210/669
4,398,998 A * 8/1983 Quame ........................ 202/94
4,840,129 A * 6/1989 Jelinek ....................... 110/229
4,918,915 A * 4/1990 Pfefferle ..................... 60/781

FOREIGN PATENT DOCUMENTS

| DE | 3406307 A | * 8/1985 |
| JP | 49-74198 A | * 7/1974 |
| JP | 49072192 A | * 7/1974 |
| JP | 49-43083 | 11/1974 |
| JP | 51-93902 | 8/1976 |
| JP | 53-120676 A | * 10/1978 |
| JP | 59-145282 | 8/1984 |
| JP | 61-195938 | 8/1986 |
| JP | 62-131233 | 8/1987 |
| JP | 6-69249 | 9/1994 |
| JP | 7-011255 | 1/1995 |
| JP | 07-332614 | 12/1995 |
| JP | 3027191 | 5/1996 |
| JP | 8-245966 | 9/1996 |
| JP | 9-241014 | 9/1997 |
| JP | 11-244820 | 9/1999 |

* cited by examiner

Primary Examiner—Stuart L. Hendrickson
Assistant Examiner—Peter J Lish
(74) Attorney, Agent, or Firm—Wenderoth, Lind & Ponack L.L.P.

(57) ABSTRACT

The present invention relates to a waste carbonization method which produces charcoal and/or activated carbon from solid wastes, such as wood waste, and renders produced gas completely harmless. Solid wastes B are exposed to gas generated in pyrolysis gasification of other wastes A in a gasification furnace 1 to produce charcoal and/or activated carbon from the solid wastes B.

5 Claims, 9 Drawing Sheets

F I G. 8
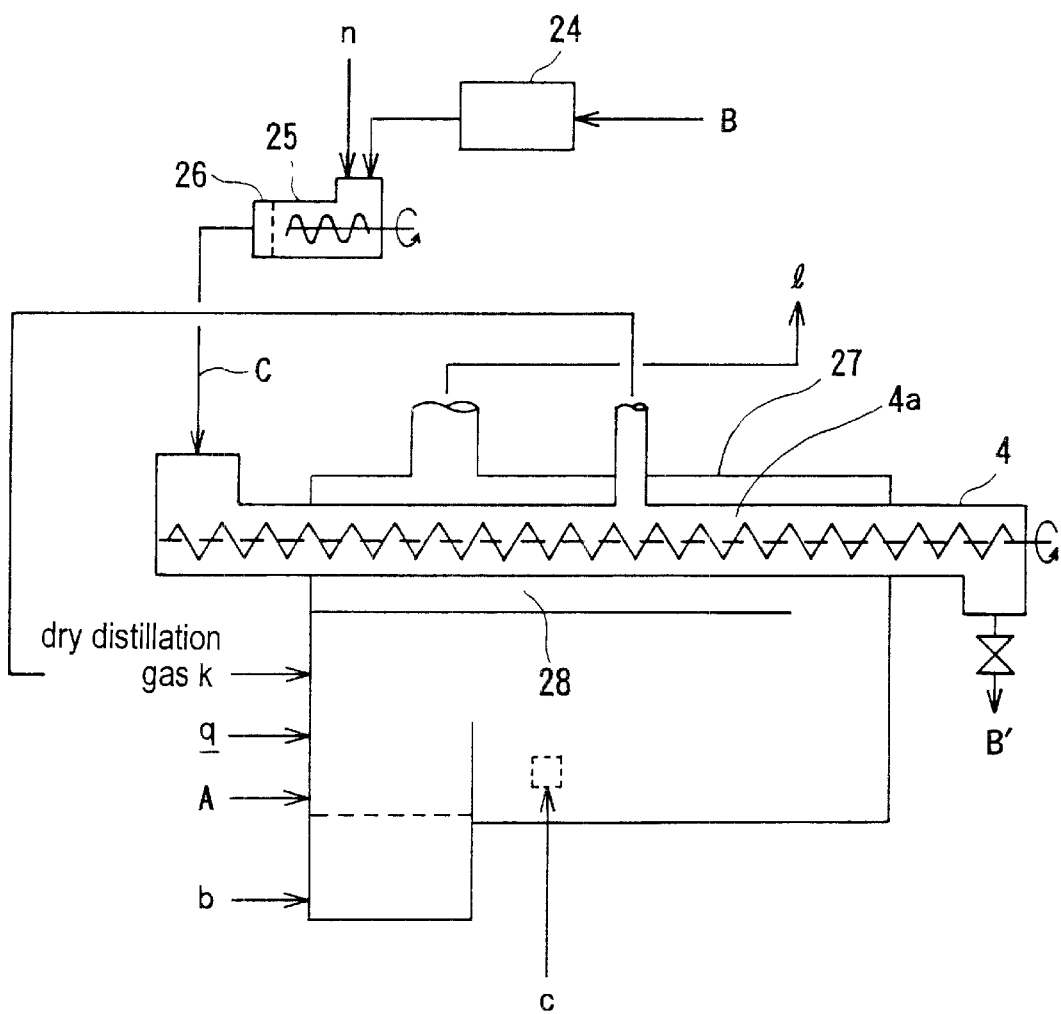

METHOD FOR CARBONIZING WASTES

TECHNICAL FIELD

The present invention relates to a waste carbonization method which carbonizes and/or activates solid wastes using other wastes.

Here, solid wastes include ① wastes such as municipal wastes or material formed by compressing and molding the wastes, ② wood wastes among demolition and construction wastes, ③ wood wastes produced from forest thinning, and ④ wastes produced from food processing, such as strained draff of beer. However, any wastes may be used as long as the wastes contain carbon. It is also possible to replace the solid wastes with materials such as wood chips which are not wastes. Other wastes may be either the above-described solid wastes or lower-quality or lower-carbon-content solid or liquid wastes. Other wastes may be replaced with fuel such as coal which is ordinarily used.

BACKGROUND ART

When organic matter is heated under appropriate conditions, the organic matter is converted through pyrolysis to a carbon-rich material, i.e., amorphous carbon. This reaction is called carbonization. According to conventional carbonization, about 10 to 20% (wet basis) of a carbonous material is converted to charcoal (in the case of wood), although this value depends on a manufacturing process. The reason why the carbonization yield is low is that a part of carbon contained in the carbonous material is slowly burned as a heat source for the carbonization. Although 80 to 90% of the carbonous material is converted into steam and gas which are then discharged, the amount of carbon dioxide discharged is also large because a part of the carbon contained in the carbonous material is burned as a heat source for the carbonization.

Further, there is a technology for producing activated carbon in a single stage from vegetable-type or mineral-type materials. According to this method, while the vegetable-type or mineral-type materials are in contact with gas containing 0.5 to 5% of oxygen by volume, calcination is carried out at a temperature of 400° C. or higher in the case of vegetable materials, and at a temperature of 500° C. or higher in the case of mineral materials to produce activated carbon. However, this method involves an economical problem, because the concentration of oxygen in gas is adjusted by adding nitrogen, argon or helium to combustion exhaust gas of coal or petroleum and valuable material is used for raw material. Specifically, the concentration of oxygen in the combustion exhaust gas is so high that expensive inert gas is necessary to adjust the oxygen concentration to 1 to 2% optimum for activation.

On the other hand, according to statistics in 1991, the annual production of wood wastes in Japan is about 36 million $m^3$, and more than 90% thereof is not re-utilized and is treated by incineration and reclamation. The wood wastes are mainly derived from demolition of houses or construction of houses, and about 74% of all of the wood wastes is occupied by such wood wastes. The wood wastes derived from demolition of houses have been subjected to preservative treatment such as CCA (chromium-copper-arsenic) treatment. Incineration or reclamation of those wood wastes leads to a fear of causing the following environmental problems: As (arsenic) is mixed into incineration exhaust gas; a high concentration of Cr (chromium) or Cu (copper) is contained in incineration ash; and arsenic, chromium or copper is eluted from landfill site.

At the present time, as a method for treatment or disposal of such wood wastes which have been subjected to preservative treatment, the following are considered: ① a method in which incineration is carried out in a furnace completely equipped with an exhaust gas purification system, and incineration ash and fly ash are stabilized and then discarded in a landfill site; ② a method in which the wood is crushed and then discarded in landfill site; and ③ a method in which heavy metals are removed by extraction with a solvent.

These methods, however, have the following problems. In the method ①, a dedicated incineration furnace equipped with an exhaust gas purification system for recovering heavy metals, and a stabilization system for stabilizing incineration ash and fly ash are necessary to thus increase treatment cost. In the method ②, the elution of arsenic, chromium, or copper produced by decayed degradation of the wood into leachate must be prevented, and a problem of the utilization of the land after reclamation remains unsolved. In the method ③, there are many unknown technical matters, and it is difficult to completely remove heavy metals from the wood.

SUMMARY OF THE INVENTION

Accordingly, the objects of the present invention are as follows:

(1) to suppress the utilization of carbon, contained in a carbonous material, as a heat source for carbonization to increase the carbonization yield, thereby reducing the amount of $CO_2$ generated (i.e., to minimize the combustion of carbon contained in the carbonous material) during carbonization;

(2) to adjust the concentration of oxygen in the surrounding gas without use of valuable materials such as nitrogen, argon, or helium; and (3) to produce activated carbon from wood wastes containing harmful materials, and make generated gas completely harmless.

Object (3) will be now described. An attempt has been made to utilize the porosity of charcoal produced from woods, and to utilize charcoal, for example, as adsorbents, moisture control materials, deodorants, and water purification agents. Further, in the iron and steel industry, the effective utilization of scrap should be promoted. Scrap contains organic matter such as plastics, paints, or oils, and there is a fear of producing harmful substances such as dioxin in a dissolution process. In case of a refuse incineration furnace, although the utilization of materials having a large adsorption capacity, such as activated carbon, is effective for the removal of harmful materials produced in the refuse incineration furnace, the use of activated carbon incurs increasing cost. Accordingly, the production of inexpensive and highly adsorptive charcoal from wood wastes to utilize the resultant charcoal as an adsorbent in a steel manufacturing process and a refuse incineration process may promote effective utilization of.wood wastes and reduce the total environmental load. One of the methods for the realization of this system is to produce charcoal having an excellent adsorption ability. Up to now, studies on technology for producing charcoal industrially and studies on conditions for producing charcoal having an excellent adsorption ability are insufficient. Accordingly, one of the subjects of the present invention is the above-mentioned object (3).

In order to achieve the above object, according to one aspect of the present invention, there is provided a method for producing charcoal and/or activated carbon from solid wastes, in which the solid wastes are exposed indirectly or directly to gas generated in pyrolysis gasification or combustion of other wastes and/or fuel.

Here, the term "carbonization" means that solid wastes as carbonous organic matter are heated and dry-distilled to produce a carbon-rich solid. The activation refers to the formation of micropores (fine pores) around macropores created by volatilization of volatile materials in the course of carbonization by heating in the presence of steam. In general, activated carbon is produced through two processes of carbonization and activation. On the other hand, according to the present invention, the carbonization and the activation are simultaneously carried out in one process, that is, through a series of steps in a single furnace.

According to the present invention, the following are possible: ① to suppress the consumption of carbon, contained in a carbonous material, as a heat source for carbonization to increase the carbonization yield, thereby suppressing the amount of $CO_2$ generated; ② to adjust the concentration of oxygen in the gas without the use of valuable materials such as nitrogen, argon, or helium; and ③ to produce charcoal or activated carbon from solid wastes such as wood wastes containing harmful materials, and make generated gas completely harmless.

According to another aspect of the present invention, there is provided a method for carbonizing and/or activating solid wastes, in which a casing containing the solid wastes is exposed to, gas generated in pyrolysis gasification of other wastes.

According to the present invention, the solid wastes contained within the casing are dry-distilled by indirect heating and are consequently converted to gas and charcoal. A part of the generated gas is cooled and condensed to obtain pyroligneous acid, while the remaining gas is returned to a gasification furnace, or a slagging combustion furnace in a subsequent stage.

According to a further aspect of the present invention, there is provided a method for producing charcoal and/or activated carbon from solid wastes, in which the solid wastes are exposed directly to gas generated in pyrolysis gasification of other wastes and/or fuel, or are dry-distilled by the generated gas.

BRIEF DESCRIPTION OF THE DRAWINGS

FIG. 8 is a schematic diagram showing still another embodiment of an apparatus for carrying out the carbonization method according to the present invention.

DETAILED DESCRIPTION OF THE INVENTION

Figure 1:
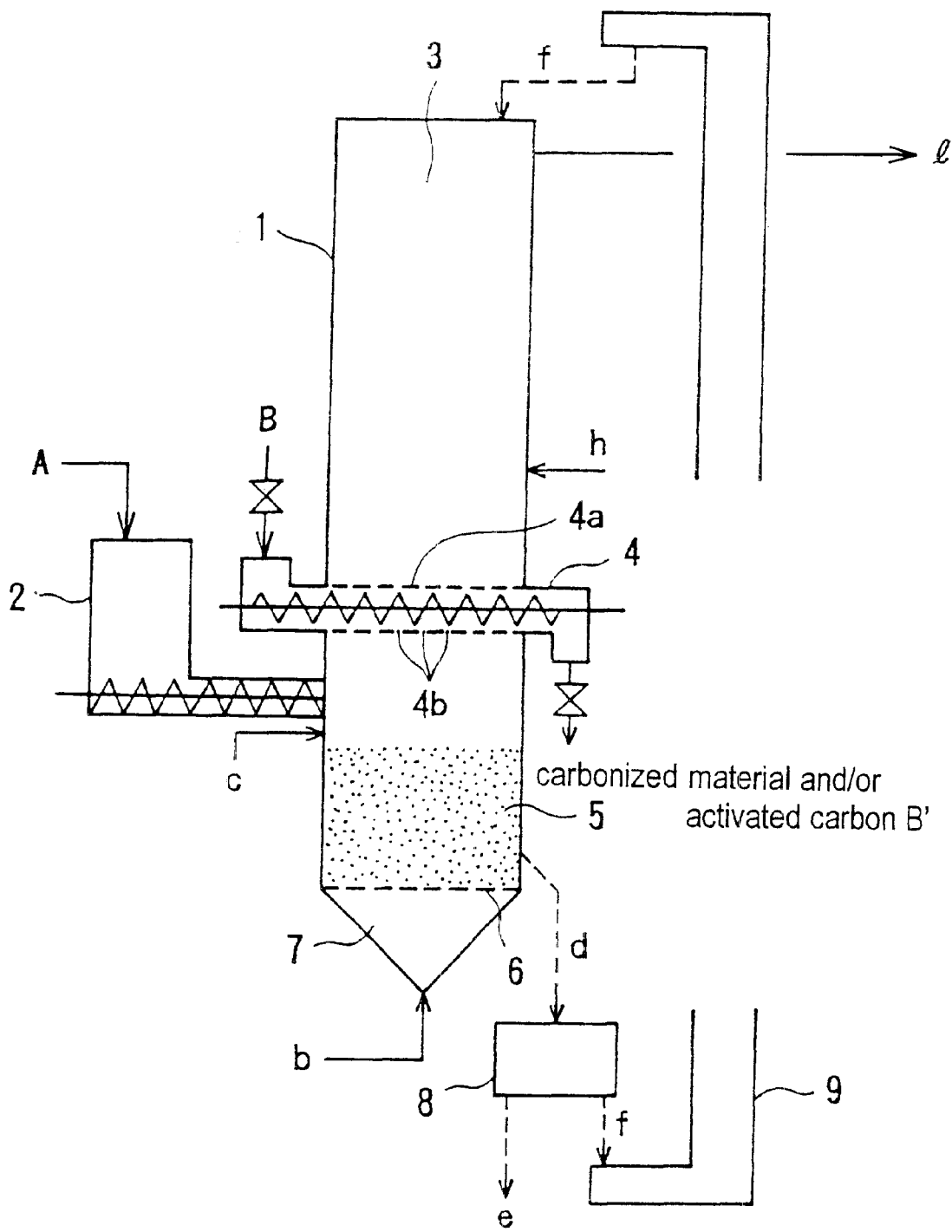
FIG. 1 is a schematic diagram showing one embodiment of an apparatus for carrying out the waste carbonization method according to the present invention.

Specific embodiments of the waste carbonization method according to the present invention will be described with reference to the accompanying drawings. However, it should be noted that the following embodiments are illustrative only and should not be construed as limiting the technical scope of the present invention. In FIGS. 1 to 9, identical or corresponding members or elements have the same reference numerals to avoid the repetition of explanation of these members or elements.

FIG. 1 is a schematic diagram showing an apparatus for carrying out the waste carbonization method according to the present invention. In FIG. 1, the reference numeral 1 designates a fluidized-bed gasification furnace. Wastes A are supplied by a constant feeder 2 to the fluidized-bed gasification furnace 1. A freeboard 3, a fluidized bed 5, an air distributing plate 6, and an air chamber 7 are provided within the fluidized-bed gasification furnace 1. A separator 8 and a bucket conveyor 9 are provided adjacent to the fluidized-bed gasification furnace 1. A fuel such as coal may be used instead of the wastes A.

A feeder 4 for supplying solid wastes B is provided in the freeboard 3 of the fluidized-bed gasification furnace 1. The feeder 4 has a casing 4a, and a large number of openings 4b are formed in the casing 4a at locations within the freeboard 3. The wastes A are gasified in the fluidized-bed gasification furnace 1, and a part of the generated pyrolysis gas passes through these openings 4b, and is brought into contact with the solid wastes B which are being carried by the feeder 4. Therefore, the solid wastes B are heated. Consequently, the solid wastes B are exposed directly to the pyrolysis gas in the feeder 4, and the solid wastes B within the feeder 4 are turned into carbonized material and/or activated carbon B'. The resultant carbonized material and/or activated carbon B' are discharged from the outlet of the feeder 4. When the solid wastes B are municipal refuse in which the amount of a wood component is small, carbonized material (typically char) is produced. On the other hand, when the solid wastes B are ligneous, activated carbon is produced. When the solid wastes B contain both the municipal refuse and ligneous matter, they are turned into carbonized material and activated carbon, respectively.

Alternatively, the entire quantity of the pyrolysis gas produced in the fluidized-bed gasification furnace 1 may be brought into contact with the casing 4a provided over substantially the entire area in the horizontal cross section of the freeboard 3, and the whole quantity of the gas may pass through the openings in the casing 4a. Further, a gutter-like porous plate may be used instead of the casing and a screw may be provided above the porous plate. Furthermore, a baffle plate for reducing the area of the freeboard may be attached, and the above-described casing or porous plate may be provided in an opening formed by the baffle plate and the freeboard. With this arrangement, the entire quantity of the pyrolysis gas generated in the gasification may surely pass through the openings of the casing.

The wastes A are subjected to, if necessary, pretreatment such as crushing, separation and dehydration, and then supplied to the fluidized-bed gasification furnace 1 at a constant rate by a screw-type constant feeder 2. Primary air b is supplied to the air chamber 7 in the gasification furnace 1, and is blown up from the air distributing plate 6 to fluidize sand on the distributing plate. Sand used as a fluidized medium is silica sand having a particle diameter of 0.5 to 1.0 mm. The wastes A supplied from a position above the fluidized bed are dropped into the fluidized bed, and brought into contact with the primary air b in the fluidized bed which is kept at a temperature of 450° C. to 650° C., preferably 500° C. to 600° C., whereby the wastes A are rapidly pyrolyzed and gasified.

In order to prevent incombustibles from accumulating within the fluidized bed, a mixture d of incombustibles and sand is continuously or intermittently discharged from the bottom of the gasification furnace 1. Incombustibles e having a large size are separated and removed by the separator 8 comprising a trommel or the like. The incombustibles contain metals such as iron, copper, and aluminum. Since the interior of the furnace is in a reducing atmosphere, metals can be recovered in such a state that adhered combustibles are removed therefrom and metals are non-oxidized, polished with sand, and clean. This is very useful for recycling worthy metals. Sand f obtained by removing the incombustibles e therefrom is carried upwardly by the bucket conveyor 9, and is again returned into the gasification furnace 1.

The wastes A introduced into the gasification furnace 1 are rapidly changed to gas, tar, and char through a pyrolysis gasification reaction. The char as carbonized material is diffused into the fluidized bed, and while being fluidized together with the sand, the char is pulverized through an oxidation reaction or a stirring action of the fluidized bed. The finely pulverized char is carried over the fluidized bed. Secondary air c is blown into the gasification furnace at a position immediately above the fluidized bed to cause secondary combustion. The temperature and oxygen concentration at a position around the carbonization apparatus (feeder 4) are controlled by the amount of secondary air c. Tertiary air h is blown into the furnace at a position above the feeder 4 to completely burn gas and the like generated in the fluidized bed 5. The pyrolysis gas generated in the course of the conversion of the solid wastes B to carbonized material or activated carbon is discharged through the openings 4b of the casing 4a of the feeder 4 into the freeboard 3 in the fluidized-bed gasification furnace 1. Then, the pyrolysis gas generated from the solid wastes B, together with the pyrolysis gas generated in the gasification of the wastes A in the fluidized bed 5, is completely burned in the freeboard 3. The temperature of the freeboard 3 is kept at 600 to 950° C. to thus avoid the formation of clinker.

As shown in FIG. 1 and as described above, the feeder 4 for the solid wastes B is provided in the freeboard 3 within the fluidized-bed gasification furnace 1. A large number of openings 4b are formed on the casing 4a of the feeder 4 installed within the freeboard 3. The casing 4a is cylindrical, and the inner diameter of the casing 4a is set to 150 to 1000 mm. The wastes A are treated in the fluidized-bed gasification furnace 1, and a part of the generated pyrolysis gas having an oxygen concentration of 0.1 to 3%, preferably 0.1 to 0.5%, and a temperature of 600 to 900° C. passes through the openings 4b and flows into the casing 4a. Thus, the solid wastes B which are being carried by the feeder 4 are heated and dry-distilled. The concentration of oxygen in the pyrolysis gas is controlled by the amount of the primary air b supplied as the fluidizing gas and the amount of the secondary air c supplied to the position immediately above the fluidized bed 5. The solid wastes B have a size of 50 to 200 mm by crushing or the like. The exposure of the solid wastes B to the pyrolysis gas in the feeder 4 for about 20 to 60 minutes results in the conversion of the solid wastes B within the feeder 4 to carbonized material and/or activated carbon B'.

Figure 2:
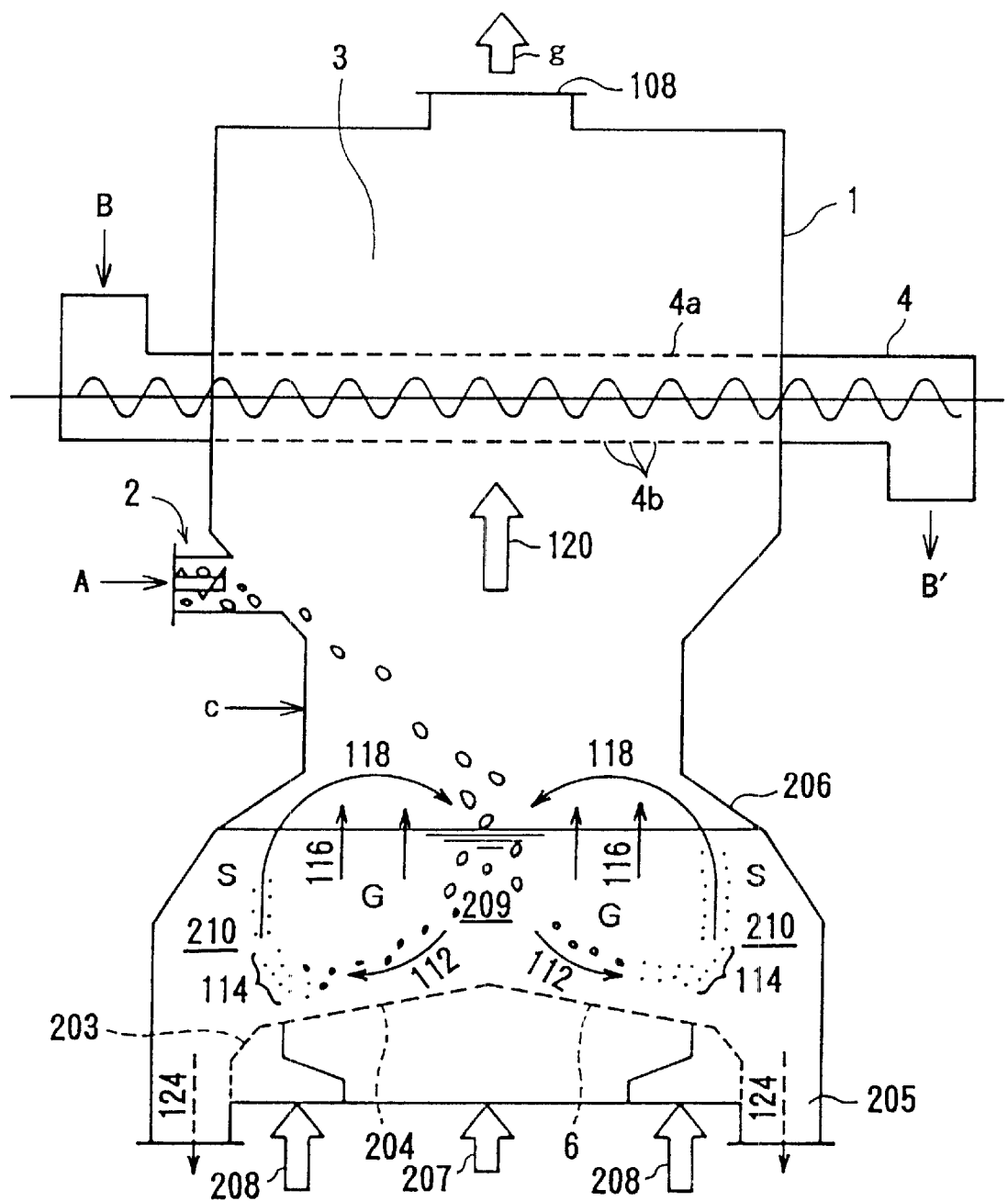
FIG. 2 is a cross-sectional view in more detail of a fluidized-bed gasification furnace used in the apparatus shown in FIG. 1.

FIG. 2 is a cross-sectional view illustrating in more detail the structure of a fluidized-bed gasification furnace 1 used in the apparatus shown in FIG. 1.

A conical distributing plate 6 is disposed at the furnace bottom of the fluidized-bed gasification furnace 1. A fluidizing gas supplied through the distributing plate 6 comprises a central fluidizing gas 207 which is supplied from a central portion 204 of the furnace bottom to the interior of the furnace as an upward flow, and a peripheral fluidizing gas 208 which is supplied from a peripheral portion 203 of the furnace bottom to the interior of the furnace as an upward flow.

The central fluidizing gas 207 comprises one of three gases: steam, a mixture of steam and air, and air. The peripheral fluidizing gas 208 comprises one of three gases: oxygen, a mixture of oxygen and air, and air. Alternatively, the peripheral fluidizing gas 208 may comprise one of three gases: steam, a mixture of steam and air, and air. It is desirable that the oxygen concentration of the central fluidizing gas is lower than that of the peripheral fluidizing gas. The total amount of oxygen in all of the fluidizing gases is set to be 10% or higher and 50% or lower of the theoretical amount of oxygen required for combustion of the wastes A.

The mass velocity of the central fluidizing gas 207 is set to be smaller than that of the peripheral fluidizing gas 208. The upward flow of the fluidizing gas in an upper peripheral region of the furnace is deflected toward a central region of the furnace by a deflector 206. Thus, a central fluidized bed 209 in which the fluidized medium (generally silica sand) is descending and diffusing is formed in the central region of the furnace, and a peripheral fluidized bed 210 in which the fluidized medium is actively fluidized is formed in the peripheral region of the furnace. As indicated by the arrows 118, the fluidized medium ascends in the peripheral fluidized bed 210 in the peripheral region of the furnace, is deflected by the deflector 206 to an upper portion of the central fluidized bed 209, and descends in the central fluidized bed 209. Then, as indicated by the arrows 112, the fluidized medium moves along the distributing plate 6 and moves to a lower portion of the fluidized bed 210. In this manner, the fluidized medium circulates through the peripheral fluidized bed 210 and the central fluidized bed 209 as indicated by the arrows 118, 112.

While the wastes A supplied to the upper portion of the fluidized bed 209 by the constant feeder 2 descend together with the fluidized medium in the fluidized bed 209, volatile matter is mainly gasified with heat held by the fluidized medium. Because there is no or little oxygen in the fluidized bed 209, pyrolysis gas generated by gasification is not burned and passes through the fluidized bed 209 as shown by the arrows 116. Consequently, the fluidized bed 209 forms a gasification zone G. The generated gas which moves into the freeboard 103 ascends as shown by the arrow 120, and passes through the openings 4b of the casing 4a. Therefore, the solid wastes B are heated to be converted into carbonized material and/or activated carbon. The gas and the like generated in the carbonization or activation of the solid wastes B, together with the above-mentioned generated gas, pass through the freeboard 3, and are discharged as a generated gas g from a gas outlet 108. In the embodiment shown in FIG. 1, the tertiary air h is blown into the freeboard 3 to completely burn the generated gas. On the other hand, in the embodiment shown in FIG. 2, the tertiary air is not blown into the freeboard 3, and hence the generated gas g is discharged from the gas outlet 108. The generated gas g discharged from the gas outlet 108 is completely burned in a subsequent combustion furnace (not shown).

Char (fixed carbon) 114, as a main component, which is not gasified moves together with the fluidized medium from the lower portion of the fluidized bed 209 to the lower portion of the fluidized bed 210 in the peripheral region of the furnace as shown by the arrows 112, and is partially oxidized by the peripheral fluidizing gas 208 having a relatively large oxygen concentration. In this manner, the fluidized bed 210 forms an oxidization zone S. Incidentally, the main component of the combustibles is char. In the fluidized bed 210, the fluidized medium is heated by combustion heat in the fluidized bed. The heated fluidized medium is turned over by the deflector 206 as shown by the arrows 118, and transferred to the central fluidized bed 209 where it serves again as a heat source for gasification. In this manner, the central fluidized bed 209 is kept at a temperature of 450 to 650° C., preferably 500 to 600° C., and incomplete combustion reaction is continued. A ring-shaped incombustibles discharge port 205 for discharging the incombustibles 124 is formed at the peripheral portion of the furnace bottom of the fluidized-bed gasification furnace 1.

In the fluidized-bed gasification furnace 1 shown in FIG. 2, the gasification zone G and the oxidization zone S are formed in the fluidized bed. Because the fluidized medium serves as a heat transfer medium in both zones, combustible gas having a high heating value is generated in the gasification zone G, and the char 114 which is difficult to be gasified is burned efficiently in the oxidization zone S. Consequently, the gasification efficiency of wastes supplied to the fluidized-bed gasification furnace 1 can be improved and combustible gas (pyrolysis gas) having a good quality can be generated.

The retention time of the solid wastes B within the freeboard 3 in the fluidized-bed gasification furnace 1 by the feeder 4 to expose the solid wastes B to pyrolysis gas generated in the fluidized-bed gasification furnace 1 may be properly controlled, by varying the carrying speed of the solid wastes B based on the composition, size, water content and the like of the solid. The retention time is as follows: ① about 20 to 40 minutes for compressed and molded municipal wastes or the like having a relatively low water content; ② 30 to 40 minutes for wood wastes among demolition construction wastes; and ③ about 30 to 60 minutes for wood wastes from forest thinning and having a relatively high water content, and ordinary solid wastes. In this manner, the retention time is mainly influenced by the content of water in the solid wastes B.

The pyrolysis gas generated in the course of the conversion of the solid wastes B to carbonized material or activated carbon may be discharged through the openings 4b of the casing 4a of the feeder 4 into the freeboard 3 in the fluidized-bed gasification furnace 1. Then, such pyrolysis gas is discharged together with the pyrolysis gas generated in the treatment of the wastes A in the fluidized-bed gasification furnace 1 from the fluidized-bed gasification furnace 1 and may be used in a pyrolysis gas utilization facility, such as a slagging combustion facility, in a subsequent stage. The openings 4b are arranged such that the hole diameter is 3 to 20 mm and the rate of hole area is 5 to 30%, preferably 10 to 20%. The openings 4b of the casing 4a serve as a passage for allowing the pyrolysis gas generated from the solid wastes A to pass therethrough and also as a discharge port for allowing steam and gas generated in the carbonization of the solid wastes B to be discharged.

An example of experimental results is shown in Table 1, and an example of the measurement results of the BET specific surface area is shown in Table 2.

TABLE 1

Test example

| Name of wastes B | Exposure time (min) | Dimension of wastes B<br>φ: Diameter of log (mm)<br>□: Side length of square lumber (mm)<br>L: Length (mm) | Weight of wastes B (g) | | Carbonization rate (%) |
|---|---|---|---|---|---|
| | | | Before treatment (before exposure) | After treatment (after exposure) | |
| RDF | 30 | φ 100 × L 225 | 271 | 58 | 21 |
| Pine (green wood) | 60 | φ 60 × L 205<br>φ 40 × L 195 | 557<br>250 | 400<br>(total) | 50 |
| Pine (wasted wood) | 30 | □ 50 × L 200 | 218 | 47 | 22 |
| Cedar (green wood) | 30 | φ 40 × L 475 | 836 | 385 | 46 |
| Cedar (wasted wood) | 30 | □ 50 × L 200<br>□ 50 × L 200 | 217<br>214 | 114<br>(total) | 27 |

Conditions:
1) Solid wastes A: Municipal wastes (collected from City F)
2) Feed rate of solid wastes A: 890 to 1020 kg/h
3) Freeboard temperature: 781 to 924° C.
4) Flow rate of secondary air: 174 to 203 m$^3$/h (NTP)

Carbonization rate=(After treatment (g)/Before treatment (g))×100 (%)

TABLE 2

Example of activation property

| Name of wastes B | BET specific surface area (m$^2$/g) |
|---|---|
| Oak (green wood) | 606 |
| Oak (wasted wood) | 220 |
| Pine (wasted wood) | 620 |
| Cedar (green wood) | 475 |
| Cedar (wasted wood) | 580 |
| RDF | 120 |

In the conventional carbonization method, since a part of the carbon contained in the material to be carbonized is burned as a heat source for carbonization, the rate of carbonization is in the range of about 10 to 20%. By contrast, according to the present invention, other wastes can be used as the heat source for carbonization. Hence, as shown in Table 1, the rate of carbonization can be improved to 21% or more.

In Table 2, the activation property is expressed as a BET specific surface area in terms of the surface area (m$^2$) per 1 g of activated carbon produced in the activation of wastes according to the present invention. As is apparent from Table 2, most of the activated carbon produced in accordance with the present invention has a specific surface area of not less than 500 (m$^2$/g), and this shows a satisfactory adsorption capacity. Charcoal produced from RDF has a small BET specific surface area. Therefore, there is a limitation on the use of the charcoal as activated carbon. However, in the case where such charcoal is manufactured to solid fuel such as charcoal ball, combustion of such solid fuel does not generate dioxin because it contains no chlorine. Further, because char does not contain chlorine, the char can be preferably used as a raw material of normal cement (portland cement). According to the present invention, in the case where wastes are carbonized and then molded, the product can have many uses as a new RDF and can simultaneously be effectively utilized.

Figure 3:
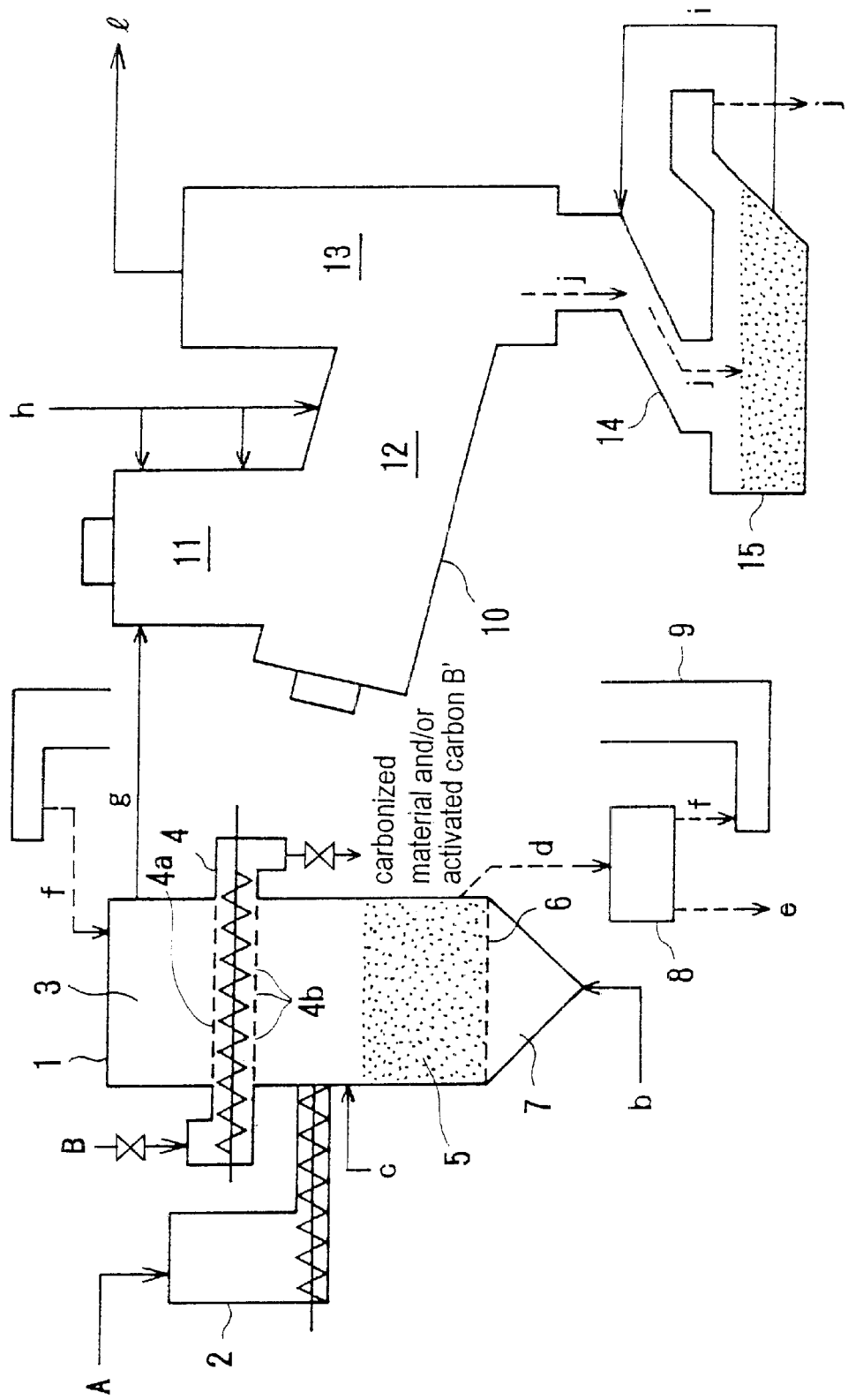
FIG. 3 is a diagram illustrating the application of the present invention to a fluidized-bed gasification and slagging combustion system.

FIG. 3 illustrates the application of the present invention to a fluidized bed gasification and slagging combustion system.

In the embodiment shown in FIG. 3, a slagging combustion furnace 10 is provided at a subsequent stage of the fluidized-bed gasification furnace 1 shown in FIG. 1. In the embodiment shown in FIG. 3, the wastes A are treated in the fluidized-bed gasification furnace 1, and a part of the generated pyrolysis gas passes through the openings 4b of the casing 4a of the feeder 4 to heat the solid wastes B, whereby the solid wastes B are converted to carbonized material and/or activated carbon B. The structure of the fluidized-bed gasification furnace 1 is the same as that of the embodiment shown in FIG. 1. The carbonization process of the solid wastes B is the same as that in the embodiment shown in FIG. 1.

In the embodiment shown in FIG. 3, however, since the tertiary air is not supplied into the fluidized-bed gasification furnace 1, the generated gas is not completely burned. More specifically, the pyrolysis gas generated in the gasification of the wastes A in the fluidized-bed gasification furnace 1 and the pyrolysis gas generated in the carbonization process of the solid wastes B are discharged together with tar and char from the gasification furnace 1, and supplied to a primary combustion chamber 11 in the slagging combustion furnace 10, and then mixed with preheated tertiary air h in a swirling flow thereof This mixture is rapidly burned at a high temperature of 1200° C. or higher, preferably 1300° C. or higher, more preferably 1200 to 1500° C., still more preferably 1300 to 1400° C. The combustion is substantially completed in a secondary combustion chamber 12, and the resultant combustion exhaust gas l is discharged from the upper part of a slag separation section 13. This high-temperature combustion converts ash content contained in the char to slag mist. Slag j trapped on the furnace wall of the primary combustion chamber 11 by the centrifugal force of the swirling flow flows down on the furnace wall due to its gravity and enters the secondary combustion chamber 12. The slag j then flows down from the secondary combustion chamber 12 into the slag separation section 13 and flows down from the lower portion of the slag separation section 13 into a water quenching trough 14. It should be noted that the structure of the slagging combustion furnace is not limited to that shown in FIG. 3.

The, water quenching trough 14 has such a structure that water flows on a slide. In order to make assurance of safe operation, the trough 14 is arranged so that even if a lump of slag drops, a steam explosion does not occur. The slag j, which has flowed down on the water quenching trough 14, comes into contact with circulating water i which flows vigorously on the trough. As a result, the slag j is rapidly cooled to thus become small bean-shaped water-quenched slag which then enters a slag conveyor 15. Then, the water-quenched slag is conveyed to the exterior by the slag conveyor 15. The water-quenched slag j carried out by the slag conveyor 15 is crushed into small particulates of several mm, while it is conveyed.

The purpose of high temperature combustion in the slagging combustion furnace 10 is also decomposition of dioxin and dioxin derivatives, and the total volume of the primary combustion chamber 11 and the secondary combustion chamber 12 is designed such that the retention time of gas is 0.5 seconds or more, preferably 1.5 to 2.0 seconds. The combustion exhaust gas 1 discharged from the slagging combustion furnace 10 passes through a series of heat recovery facilities such as a waste heat boiler, an economizer and an air preheater, and a dedusting facilities, and is then discharged to the atmosphere. Start-up oil burners are provided in each of the primary and secondary combustion chambers in the slagging combustion furnace 10. If the solid wastes B are wood wastes or the like which have been subjected to preservative treatment, it is desirable to use the gasification and slagging combustion system shown in FIG. 3. About 90% of ash is recovered as harmless slag, and the remaining 10% of fly ash (collected by a dedusting facility) is subjected to stabilizing treatment.

Figure 4:
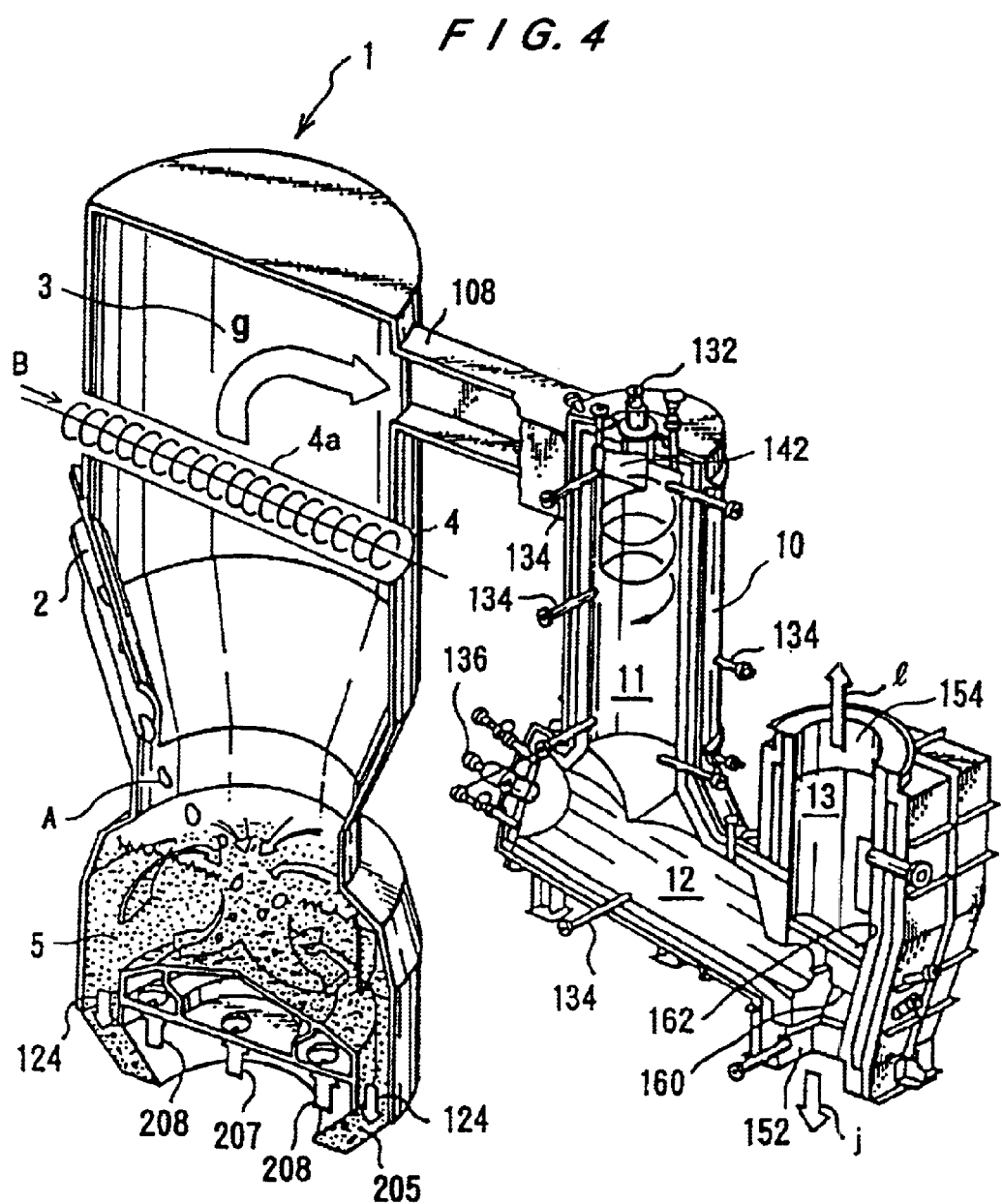
FIG. 4 is a vertical sectional perspective view in more detail of a fluidized-bed gasification furnace and a slagging combustion furnace used in the apparatus shown in FIG. 3.

FIG. 4 is a vertical sectional perspective view illustrating in more detail the structure of a fluidized-bed gasification furnace 1 and a slagging combustion furnace 10 used in the apparatus shown in FIG. 3.

As shown in FIG. 4, the fluidized-bed gasification furnace 1 has the same structure as that shown in FIG. 2, and hence the explanation thereof is omitted. The feeder shown in FIG. 4 is a single screw feeder. Alternatively, a multi-screw feeder may be used. That is, the multi-screw feeder may be arranged so that a plurality of single screw feeders having casings are juxtaposed, or a plurality of screw feeders having a single casing are juxtaposed. The gas outlet 108 of the fluidized-bed gasification furnace 1 is connected to a gas inlet 142 of a slagging combustion furnace 10. The slagging combustion furnace 10 includes a cylindrical primary combustion chamber 11 having a substantially vertical axis and a secondary combustion chamber 12 which is arranged in a horizontal direction. The combustible gas g and fine particles generated in the fluidized-bed gasification furnace 1 are supplied through the gas inlet 142 into the primary combustion chamber 11 so as to swirl around the axis of the primary combustion chamber 11.

The primary combustion chamber 11 has a start-up burner 132 mounted on its top, and a plurality of air nozzles 134 for supplying combustion air so as to swirl around the axis of the primary combustion chamber 11. The secondary combustion chamber 12 has an auxiliary burner 136 disposed in the vicinity of the junction between the primary and secondary combustion chambers, and has air nozzles 134 for supplying combustion air. The slag separation section 13 has a lower end which communicates with the secondary combustion chamber 12, and has a discharge port 152 disposed at a lower portion of the secondary combustion chamber 12 for discharging molten ash therethrough, and an exhaust port 154 disposed above the discharge port 152. A radiation plate 162 is provided within the slag separation section 13 to reduce the quantity of emitted heat through the exhaust port 154 by way of radiation. Incidentally, the radiation plate 162 may be omitted.

Figure 5:
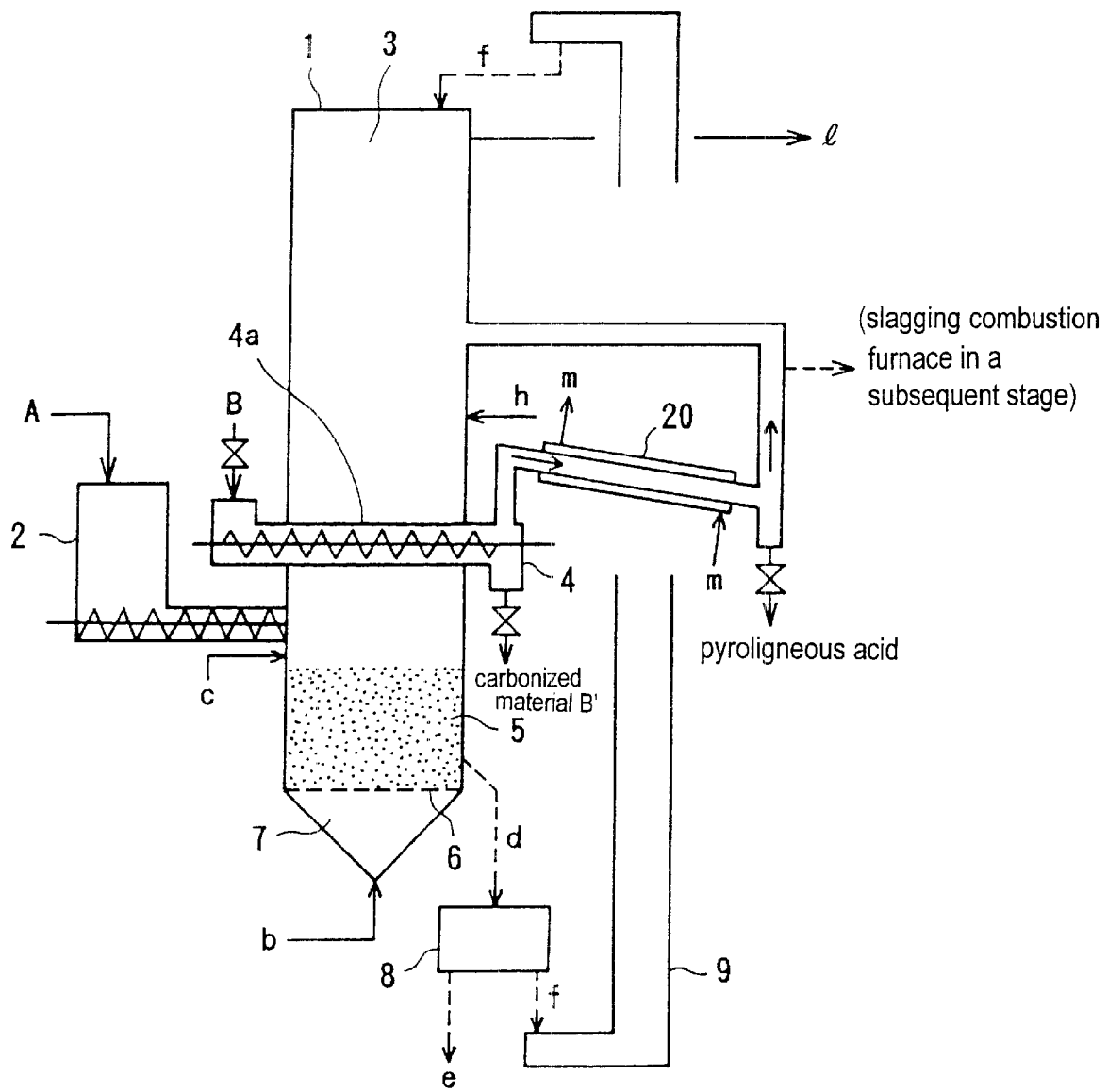
FIG. 5 is a schematic diagram showing another embodiment of an apparatus for carrying out the carbonization method according to the present invention.

FIG. 5 is a schematic diagram showing another embodiment of the structure of an apparatus for carrying out the carbonization method according to the present invention in a fluidized bed gasification and slagging combustion system.

In this embodiment, the structure of the feeder 4 is different from the structure of the feeder 4 shown in FIG. 1. Specifically, the casing 4a of the feeder 4 has no opening or only a small number of openings. It there are no openings, the pyrolysis gas generated in the gasification of the wastes A in the fluidized-bed gasification furnace 1 comes into contact with the outer surface of the casing 4a of the feeder 4. Consequently, the solid wastes B within the casing 4a are dry-distilled by transferred heat through the casing 4a, and are carbonized and converted to gas and charcoal. The gas produced by the carbonization (i.e., carbonization gas) is discharged to the exterior of the casing 4a, and is indirectly cooled with a cooling medium m in a cooling section 20, whereby a part of the gas is condensed. Pyroligneous acid and the like are recovered from a condensate produced by the condensation of the gas. The remaining gas, containing a harmful component is returned to the freeboard 3, after the recovery of pyroligneous acid, and is completely burned to be rendered harmless. Alternatively, the generated gas may be returned to the freeboard 3 without cooling. Further, as indicated by an arrow having a broken line in FIG. 5, the gas, containing a harmful component, may be supplied to a combustion furnace in a subsequent stage after the recovery of pyroligneous acid (the slagging combustion furnace 10 in a subsequent stage shown in FIG. 3), where the gas may join the gas discharged from the gasification furnace 1, and then burned.

As described above, in the case where there is no opening in the casing 4a, activation conditions to produce activated carbon cannot be obtained, resulting in small BET specific surface area. In this case, however, charcoal (dry-distilled charcoal) is obtained. If activated carbon is desired, activation conditions should be given. Therefore, it is desirable to provide small openings such that a part of the gas generated in the gasification of the wastes A can enter into the casing 4a. If the activation is to be promoted, the number of openings of the casing 4a may be increased. In this case, however, it is necessary to provide draft equipment such as a fan in a line for discharging the gas to the outside. In this embodiment, high-temperature pyrolysis gas generated in the pyrolysis gasification of other wastes is used as a heat source for the carbonization. Alternatively, high-temperature combustion gas generated in the combustion of other wastes may be used.

Figure 6:
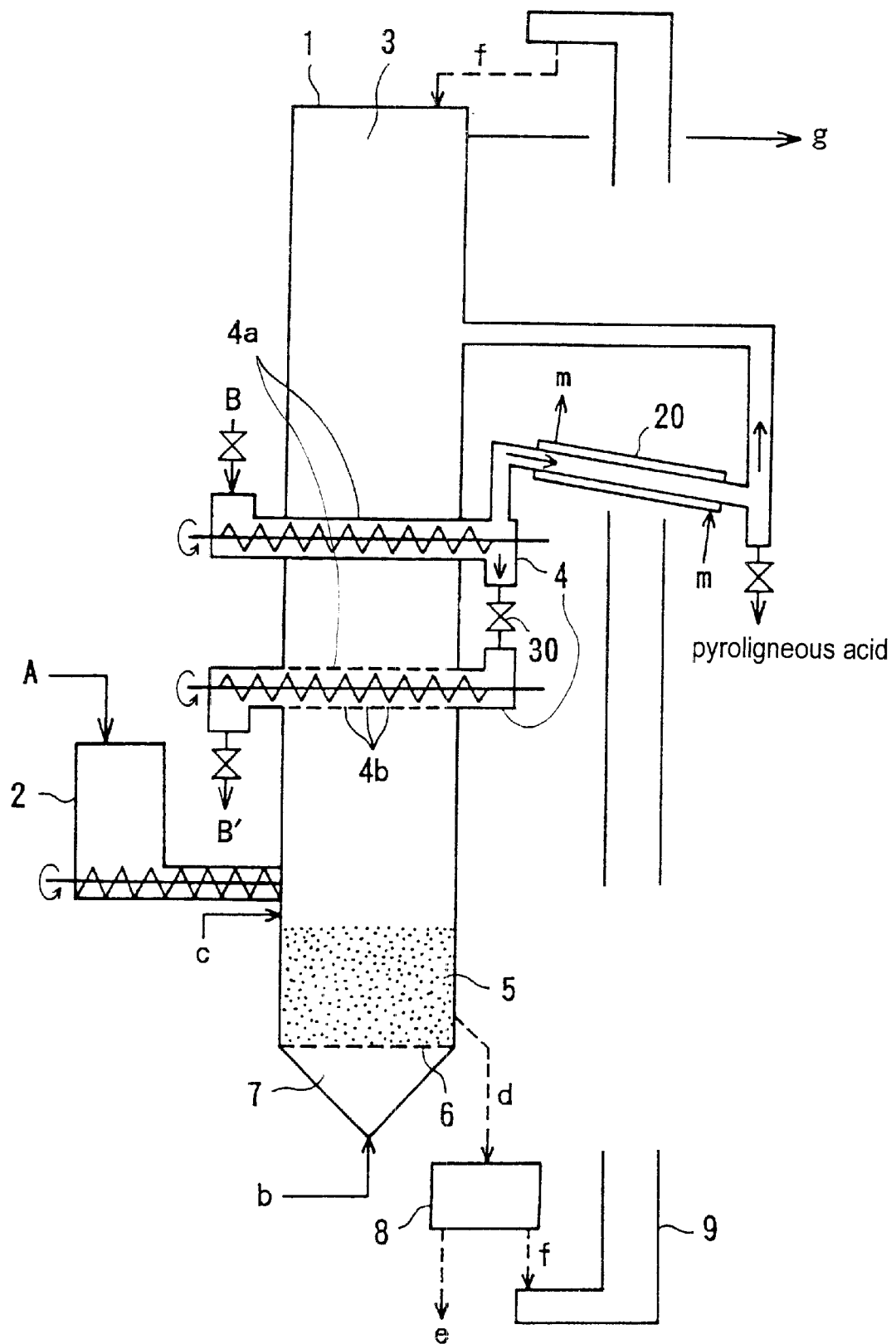
FIG. 6 is a schematic diagram showing still another embodiment of an apparatus for carrying out the carbonization method according to the present invention.

Further, as shown in FIG. 6, the feeder 4 shown in FIG. 5 may also be incorporated in the apparatus shown in FIG. 3. Specifically, in the embodiment shown in FIG. 6, the solid wastes B are supplied to the upper casing 4a, and then transferred to the lower casing 4a through a valve 30, and carbonized material and/or activated carbon B' are withdrawn from the outlet of the lower casing. Other functions are the same as those of the embodiment shown in FIG. 5. As shown in FIGS. 1, 3, 5 and 6, a damper is provided on the inlet side and outlet side of the feeder 4, respectively. Further, as shown in FIGS. 5 and 6, a valve is provided on a pyroligneous acid discharge port in the downstream side of the cooling section 20. Alternatively, the generated gas may be returned to the freeboard 3 without cooling. Further, the generated gas may be supplied to a combustion furnace in a subsequent stage (not shown), and the supplied gas, together with the gas discharged from the gasification furnace, may be burned in the combustion furnace.

Figure 7:
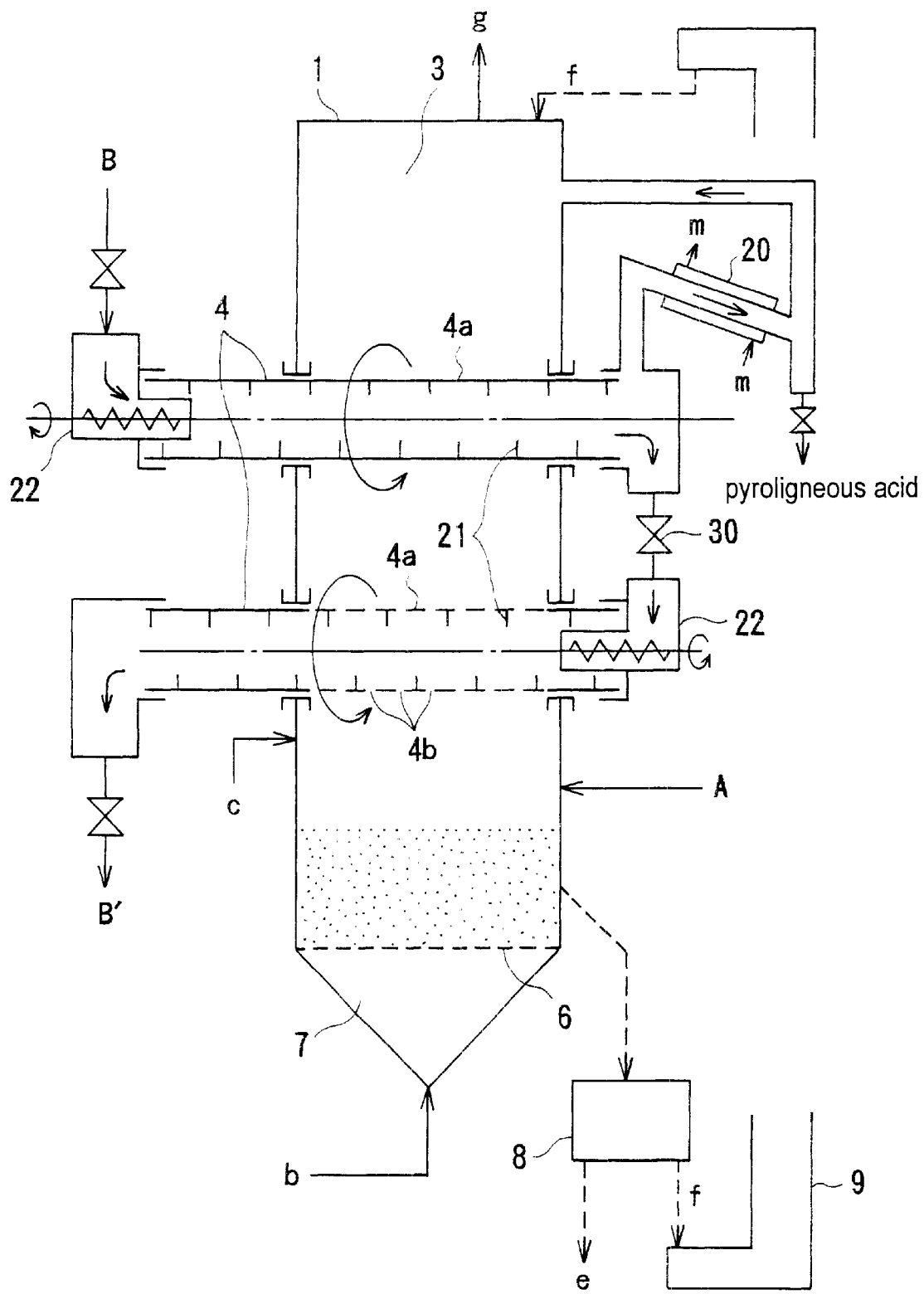
FIG. 7 is a schematic diagram showing still another embodiment of an apparatus for carrying out the carbonization method according to the present invention.

FIG. 7 is a schematic diagram showing still another embodiment of the apparatus for carrying out the carbonization method according to the present invention in a fluidized bed gasification and slagging combustion system.

In this embodiment, the structure of the feeder 4 is different from that of the feeder 4 shown in FIG. 6. Specifically, the casing 4a of the feeder 4 is rotatable. The feeder 4 has a rotating drum-type structure in which fins 21 having a height of 30 to 100 mm are spirally attached within the casing 4a for carrying the contents in the axial direction. The casings 4a are provided at upper and lower portions of the furnace. The casing 4a (upper casing) has no openings 4b, and the casing 4a (lower casing) has openings 4b as shown in the drawing. Each casing 4a is designed so as to rotate around its axis by a motor (not shown). It goes without saying that a gas seal device is provided at the boundary between the casing 4a and the fluidized-bed gasification furnace 1. Further, conveying equipment 22 for supplying materials to be carbonized to the casing 4a is provided at the inlet of each casing 4a. The solid wastes B are supplied to the upper casing 4a, and then transferred to the lower casing 4a through a valve 30, and carbonized material and/or activated carbon B' are withdrawn from the outlet of the lower casing. Alternatively, the casing 4a may not be divided into upper and lower casings and may have only a single casing as shown in FIG. 1. In this case, the first half portion of casing 4a is free from openings and performs dry distillation of the solid wastes B, while the latter half portion of casing 4a has openings and activation. In this method, since the gas generated in the dry distillation and activation is discharged into the freeboard, pyroligneous acid cannot be recovered.

FIG. 8 is a schematic diagram showing still another embodiment of the apparatus for carrying out the carbonization method according to the present invention.

The solid wastes B are crushed by a crusher 24 into a size of 1 to 50 mm, preferably 3 to 20 mm. In a kneader 25, the crushed wastes and a binder n are kneaded together, and are squeezed out by a die 26 provided at the discharge portion of the kneader 25 to produce compression molded wastes C. The wastes A are supplied to a combustor 27, and are burned by the primary air b and the secondary air c. The feeder 4 provided within a heating chamber 28 in the combustor 27 comprises a casing 4a having no opening 4b, and the compression molded wastes C are dry-distilled within the heating chamber 28 to thus form carbonized material. On the other hand, dry distillation gas k generated in the dry distillation is returned to the combustor 27 and used as fuel. A facility for supplying auxiliary fuel q for start-up and auxiliary purposes is provided in the combustor 27. The casing 4a may have the above-described rotating drum-type structure, and the screw feeder within the casing 4a may be omitted. Further, the openings 4b may be provided in the casing 4a.

Figure 9:
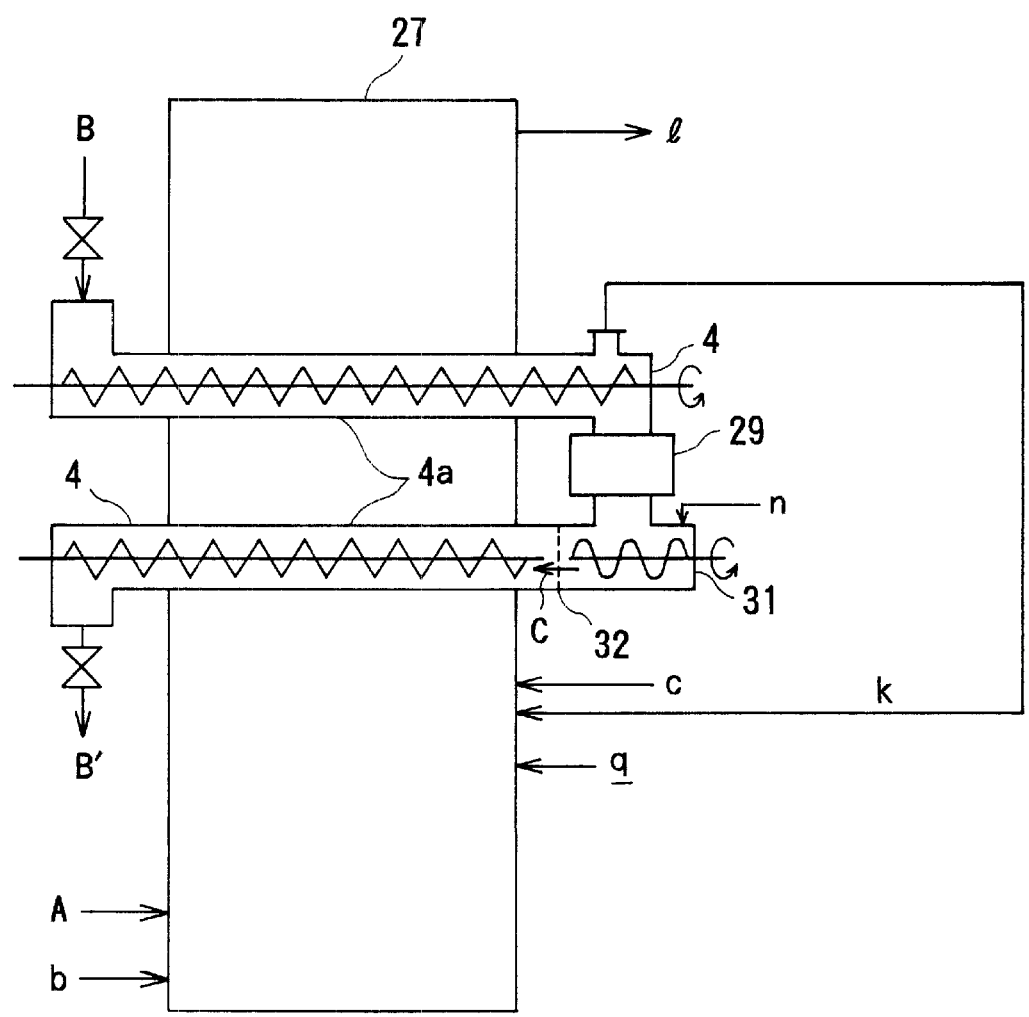
FIG. 9 is a schematic diagram showing still another embodiment of an apparatus for carrying out the carbonization method according to the present invention.

FIG. 9 is a schematic diagram showing still another embodiment of the apparatus for carrying out the carbonization method according to the present invention.

The solid wastes B are carbonized within the casing 4a of the upper feeder 4 provided within the combustor 27, and then crushed by a crusher 29 into a size of 1 to 50 mm, preferably 3 to 20 mm. Thereafter, in a kneader 31, the crushed wastes are kneaded together with a binder n, and then compressed and molded by a die 32, provided at the outlet of the kneader 31, to produce compression molded wastes C. Thereafter, the compression molded wastes C are heated within the casing 4a of the lower feeder 4, and then discharged from the casing 4a as granular charcoal B'. In this connection, the casing 4a may have the above-described rotating drum-type structure shown in FIG. 7 and the screw within the casing 4a may be omitted. Further, the openings 4b may be provided in the casing 4a. In this case, the number of casings 4a may be plural at the upper and lower portions, respectively.

Further, for example, in the embodiment shown in FIG. 2, the gas after the carbonization contains a great deal of hydrogen and carbon monoxide. Hence, the gas generated in the pyrolysis gasification furnace 1 can be treated and converted to obtain a fuel gas for fuel cells.

In the embodiments shown in the drawings, although the number of casings 4a is 1 or 2, the number of the casing 4a having openings 4b and the number of the casing 4a having no opening 4b may be plural, respectively.

The casings 4a shown in FIGS. 1 to 6 may be the rotating drum type shown in FIG. 7.

According to the present invention, the time for the wastes to be exposed to pyrolysis gas having an oxygen concentration of about 0.1 to 3%, preferably 0.1 to 0.5%, and a temperature of 600 to 950° C. is as follows: ① about 20 to 40 minutes in the case of compression molded products of municipal wastes or the like, ② 30 to 40 minutes in the case of wood wastes among demolition and construction wastes, and ③ about 30 to 60 minutes in the case of wastes generated from forest thinning, and ordinary solid wastes. Thus, the solid wastes can be carbonized in a relatively short time of about 30 to 60 minutes. Further, in the case where municipal wastes or the like are converted to RDF and then carbonized, a large quantity of energy is consumed for converting the wastes to RDF. However, if the municipal wastes or the like are carbonized without much labor and a number of processes, such carbonization process is more economical. In this case, char as a carbonized material can be easily separated from incombustibles.

As is apparent from the above-mentioned description, the present invention can offer the following advantages. (1) The utilization of carbon, contained in a carbonaceous material, as a heat source for carbonization can be suppressed to increase the carbonization yield, thereby suppressing the amount of $CO_2$ generated. That is, the combustion of carbon contained in the carbonaceous material can be minimized during the carbonation. (2) The concentration of oxygen in gas can be controlled without the use of valuable materials, such as nitrogen, argon, and helium. (3) Activated carbon can be produced from wood wastes containing harmful materials, and the generated ash and gas can be made harmless.

INDUSTRIAL APPLICABILITY

According to the present invention, charcoal and/or activated carbon can be produced by carbonization and/or activation of wastes, and hence the present invention can be utilized for converting wastes to resources.

What is claimed is:

1. A method of producing at least one of charcoal and activated carbon from solid wastes, said method comprising:

performing one of pyrolysis gasification and combustion of at least one of a secondary waste material and fuel in a fluidized-bed furnace to generate gas; and supplying the solid wastes to a freeboard of the fluidized-bed furnace via a casing arranged through the freeboard, the casing having an upstream portion and a downstream portion with respect to a flow of the solid wastes therethrough, and the casing having openings only in the downstream portion so as to allow the generated gas to pass through the casing such that the solid wastes are directly exposed to the generated gas to produce the at least one of charcoal and activated carbon from the solid wastes.

2. A method of producing at least one of charcoal and activated carbon from solid wastes, said method comprising:

performing one of pyrolysis gasification and combustion of at least one of a secondary waste material and fuel in a fluidized-bed furnace to generate gas; and supplying the solid wastes to a freeboard of the fluidized-bed furnace via a plurality of casings arranged through the freeboard such that the solid wastes first pass through a first casing and then pass through a second casing, the first casing having no openings for allowing the generated gas to pass therethrough, and the second casing having openings to allow the generated gas to pass through the casing such that the solid wastes are directly exposed to the generated gas, whereby at least one of carbonization and activation of the solid wastes is accomplished to produce the at least one of charcoal and activated carbon from the solid wastes.

3. A method of producing carbonized material from solid wastes, said method comprising:

providing a feeder in a freeboard of a fluidized-bed furnace;

combusting a secondary waste material in said fluidized-bed furnace to generate gas;

carrying the solid wastes using the feeder;

heating the solid wastes indirectly by the generated gas while the solid wastes are carried by the feeder so as to produce carbonization gas and the carbonized material; and supplying the carbonization gas produced from the solid wastes to the freeboard of the fluidized-bed furnace.

4. The method of claim 3, further comprising crushing the solid wastes, mixing the crushed solid wastes with a binder to form a mixture, and molding the mixture, said heating the solid wastes comprising heating the molded mixture including the solid wastes.

5. The method of claim 3, further comprising crushing the carbonized material, mixing the crushed carbonized material with a binder to form a mixture, and molding the mixture to produce carbonized material.

* * * * *